US011104354B2

(12) United States Patent
Park

(10) Patent No.: US 11,104,354 B2
(45) Date of Patent: Aug. 31, 2021

(54) APPARATUS AND METHOD FOR RECOMMENDING FUNCTION OF VEHICLE

(71) Applicants: HYUNDAI MOTOR COMPANY, Seoul (KR); KIA MOTORS CORPORATION, Seoul (KR)

(72) Inventor: Sung Soo Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 341 days.

(21) Appl. No.: 16/035,291

(22) Filed: Jul. 13, 2018

(65) Prior Publication Data
US 2019/0256107 A1    Aug. 22, 2019

(30) Foreign Application Priority Data
Feb. 19, 2018    (KR) .................. 10-2018-0019179

(51) Int. Cl.
*B60W 50/14* (2020.01)
*G01C 21/36* (2006.01)
(Continued)

(52) U.S. Cl.
CPC ......... *B60W 50/14* (2013.01); *G01C 21/3626* (2013.01); *B60L 2250/00* (2013.01);
(Continued)

(58) Field of Classification Search
CPC .............. G06F 16/3344; G06F 16/2458; G06F 16/248; G06F 17/30; G06F 3/0233;
(Continued)

(56) References Cited

U.S. PATENT DOCUMENTS

| 5,898,392 A | * | 4/1999 | Bambini | .................. B60R 1/12 |
| | | | | 340/996 |
| 9,374,693 B1 | * | 6/2016 | Olincy | .............. H04M 3/42365 |

(Continued)

OTHER PUBLICATIONS

Parametrization of nonlinear trajectory for time optimal 2D path planning for Unmanned Aerial Vehicles Joe Woong Yeol ; Yong-Won Hwang; 2016 2nd International Conference on Control, Automation and Robotics (ICCAR); Conference Paper; Publisher: IEEE 2016.*

(Continued)

*Primary Examiner* — Cuong H Nguyen

(57) ABSTRACT

The present disclosure provides an apparatus for recommending a function of a vehicle. The apparatus includes a communication circuit configured to communicate with an external device, an output device configured to provide information to a user of the vehicle, a memory, and a processor configured to be electrically connected with the communication circuit, the output device, and the memory. The processor is configured to obtain a message associated with the user of the vehicle from an external device using the communication circuit, extract event information associated with movement of the user from the message associated with the user, and when a specified condition corresponding to the event information is met, output a notification of recommending execution of a task associated with the event information using the output device.

11 Claims, 11 Drawing Sheets

(51) Int. Cl.
*G06Q 50/30* (2012.01)
*B60R 16/037* (2006.01)

(52) U.S. Cl.
CPC ......... *B60L 2250/16* (2013.01); *B60R 16/037* (2013.01); *G01C 21/3641* (2013.01); *G06Q 50/30* (2013.01)

(58) Field of Classification Search
CPC . G06F 3/0236; B60R 1/12; B60R 2001/1215; B60R 2001/1284; G01C 21/3629; H04M 1/6075; H04R 2499/13
USPC .................................................. 345/156, 173
See application file for complete search history.

(56) References Cited

U.S. PATENT DOCUMENTS

| | | | | |
|---|---|---|---|---|
| 9,493,130 B2* | 11/2016 | Penilla | ................. | G10L 15/25 |
| 9,672,823 B2* | 6/2017 | Penilla | ................. | G10L 15/005 |
| 10,339,711 B2* | 7/2019 | Ng-Thow-Hing | ..... | G02B 27/01 |
| 10,424,296 B2* | 9/2019 | Penilla | ................. | G06K 9/00845 |
| 2005/0165739 A1* | 7/2005 | Yamamoto | ............. | H04N 7/165 |
| 2006/0190167 A1* | 8/2006 | Inukai | ............. | G08G 1/096866 |
| | | | | 701/533 |
| 2007/0124066 A1* | 5/2007 | Kikuchi | ........... | G08G 1/096811 |
| | | | | 701/533 |
| 2008/0287150 A1* | 11/2008 | Jiang | ................. | G06Q 30/0277 |
| | | | | 455/466 |
| 2009/0112463 A1* | 4/2009 | Yamane | ............... | G09B 29/106 |
| | | | | 701/533 |
| 2010/0030463 A1* | 2/2010 | Tomizawa | ....... | G08G 1/096844 |
| | | | | 701/533 |
| 2010/0094689 A1* | 4/2010 | Fodor | ................... | G06Q 10/10 |
| | | | | 705/14.1 |
| 2010/0131191 A1* | 5/2010 | Ohki | ............... | G08G 1/096872 |
| | | | | 340/995.19 |
| 2010/0184453 A1* | 7/2010 | Ohki | .................... | G01C 21/362 |
| | | | | 455/456.3 |
| 2010/0211595 A1* | 8/2010 | Yamamoto | ......... | H04N 21/4147 |
| | | | | 707/769 |
| 2010/0312466 A1* | 12/2010 | Katzer | ............. | G08G 1/096838 |
| | | | | 701/533 |
| 2011/0015857 A1* | 1/2011 | Uotani | ................. | G08G 1/0969 |
| | | | | 701/533 |
| 2011/0238290 A1* | 9/2011 | Feng | .................... | G08G 1/0969 |
| | | | | 701/533 |
| 2011/0238298 A1* | 9/2011 | Machino | ............ | G01C 21/3461 |
| | | | | 701/533 |
| 2011/0276396 A1* | 11/2011 | Rathod | ................. | H04L 51/066 |
| | | | | 705/14.49 |
| 2012/0011238 A1* | 1/2012 | Rathod | ................. | G06Q 20/10 |
| | | | | 709/223 |
| 2012/0191341 A1* | 7/2012 | Nara | .................... | G01C 21/362 |
| | | | | 701/420 |
| 2012/0316962 A1* | 12/2012 | Rathod | ................ | G06Q 10/107 |
| | | | | 705/14.54 |
| 2014/0006306 A1* | 1/2014 | Koshy | .................... | G06Q 10/10 |
| | | | | 705/345 |
| 2014/0046594 A1* | 2/2014 | Watanabe | .......... | G01C 21/3415 |
| | | | | 701/533 |
| 2014/0074629 A1* | 3/2014 | Rathod | .............. | G06Q 30/0277 |
| | | | | 705/14.73 |
| 2014/0129942 A1* | 5/2014 | Rathod | ............ | H04N 21/44222 |
| | | | | 715/720 |
| 2014/0163849 A1* | 6/2014 | Adam | ................. | G01C 21/3492 |
| | | | | 701/118 |
| 2014/0164506 A1* | 6/2014 | Tesch | ...................... | H04L 51/32 |
| | | | | 709/204 |
| 2014/0164507 A1* | 6/2014 | Tesch | ...................... | H04L 51/10 |
| | | | | 709/204 |
| 2014/0343837 A1* | 11/2014 | Nishibashi | ............. | G01C 21/34 |
| | | | | 701/410 |
| 2015/0062168 A1* | 3/2015 | Ng-Thow-Hing | ........................... G02B 27/0101 |
| | | | | 345/633 |
| 2016/0014151 A1* | 1/2016 | Prakash | .............. | H04L 63/1483 |
| | | | | 726/22 |
| 2016/0104486 A1* | 4/2016 | Penilla | ................. | G10L 15/005 |
| | | | | 704/232 |
| 2016/0162172 A1* | 6/2016 | Rathod | .................... | G06F 9/451 |
| | | | | 715/747 |
| 2016/0373293 A1* | 12/2016 | Kushmerick | ........... | H04L 67/10 |
| 2017/0054668 A1* | 2/2017 | Lee | .................... | H04M 1/72552 |
| 2017/0061965 A1* | 3/2017 | Penilla | .............. | G06K 9/00845 |
| 2017/0078386 A1* | 3/2017 | Ahn | ....................... | H04L 51/08 |
| 2017/0140757 A1* | 5/2017 | Penilla | .................... | G10L 25/63 |
| 2018/0013702 A1* | 1/2018 | Bryan | .................... | G06F 9/451 |

OTHER PUBLICATIONS

Comparison of Car-Following Behavior in Terms of Safety Indicators Between China and Sweden; Tong Liu ; Selpi IEEE Transactions on Intelligent Transportation Systems; Year: 2019; Early Access Article; Publisher: IEEE.*

Target tracking onboard an autonomous underwater vehicle: determining optimal towed array heading in an anisotropic noise field; MA Parra-Orlandoni Maria Alejandra—2007—dspace.mit.edu (Year: 2007).*

Kortuem, "When peer-to-peer comes face-to-face: collaborative peer-to-peer copmuting in mobile ad-hoc networks", Aug. 2001, Peer-to-Peer Compting, 2001, Proceedings, First International Conference, p. 75-91.*

* cited by examiner

APPARATUS AND METHOD FOR RECOMMENDING FUNCTION OF VEHICLE

CROSS-REFERENCE TO RELATED APPLICATION

The present application claims priority to and the benefit of Korean Patent Application No. 10-2018-0019179, filed on Feb. 19, 2018, which is incorporated herein by reference in its entirety.

TECHNICAL FIELD

The present disclosure relates to an apparatus and method for recommending a function in a vehicle based on user information.

BACKGROUND

The statements in this section merely provide background information related to the present disclosure and may not constitute prior art.

With the development of the auto industry, a system for executing a function based on a user message including a voice or text has been developed to provide convenience to a driver. When a user message is input, the above-mentioned system may execute a function corresponding to the input message. The system may analyze the input message and may recommend one of various functions associated with the input message.

A conventional system may execute a function associated with a message of a user only after the message of the user is input. Thus, the user should first input a message to an input device of a vehicle to use the system. The system may passively operate according to a command of the user.

SUMMARY

One form of the present disclosure provides an apparatus and method for extracting information associated with movement from a user message capable of being collected in a vehicle and actively and proactively recommending a function associated with the extracted information.

The technical problems to be solved by the present inventive concept are not limited to the aforementioned problems, and any other technical problems not mentioned herein will be clearly understood from the following description by those skilled in the art to which the present disclosure pertains.

In some forms of the present disclosure, an apparatus for recommending a function of a vehicle may include: a communication circuit configured to communicate with an external device, an output device configured to provide information to a user of the vehicle, a memory, and a processor configured to be electrically connected with the communication circuit, the output device, and the memory. The processor may be configured to obtain a message associated with the user from the external device using the communication circuit, extract event information associated with movement of the user from the message associated with the user, and when a specified condition corresponding to the event information is met, output a notification of recommending execution of a task associated with the event information using the output device.

In some forms of the present disclosure, the message associated with the user may include at least a portion of an electronic mail (e-mail) in which the user is included as a recipient or a sender, a short message service (SMS) message, an instant message, or a messenger message.

In some forms of the present disclosure, the message associated with the user may include a text message obtained from an utterance of the user or an utterance of a party speaking with the user.

In some forms of the present disclosure, the processor may be configured to extract an updated message from the message associated with the user, the messages being stored in the external device and store the updated message in a message database (DB) stored in the memory.

In some forms of the present disclosure, the processor may be configured to classify the message associated with the user into a plurality of groups depending on an intent of the user, the intent being included in the message associated with the user.

In some forms of the present disclosure, the processor may be configured to generate the event information including at least a portion of purpose information, date information, time information, location information, or title information by analyzing the message associated with the user.

In some forms of the present disclosure, the processor may be configured to store the event information in an event management DB stored in the memory in order of time corresponding to the event information.

In some forms of the present disclosure, the processor may be configured to, when the event information is associated with reservation cancellation, delete an event corresponding to the reservation cancellation from the event management DB.

In some forms of the present disclosure, the processor may be configured to determine priorities of recommendations based on a number of recommendations and a number of approvals to the recommendations, wherein the number of recommendations and the number of approvals are associated with a category including the event information.

In some forms of the present disclosure, the processor may be configured to, when a current time is included in a time interval corresponding to the date information and the time information, which are included in the event information, output the notification.

In some forms of the present disclosure, the processor may be configured to, when a current location is included in an area corresponding to the location information included in the event information, output the notification.

In some forms of the present disclosure, the processor may be configured to output the notification of inquiring about whether to execute a route guidance to a location corresponding to the event information.

In some forms of the present disclosure, the output device may include at least one of a speaker or a display.

In some forms of the present disclosure, the notification may include at least one of a voice notification or a notification message.

According to another form of the present disclosure, a method for recommending a function of a vehicle may include: obtaining a message associated with a user of the vehicle from an external device, extracting event information associated with movement of the user from the message associated with the user, and, when a specified condition corresponding to the event information is met, outputting a notification of recommending execution of a task associated with the event information.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
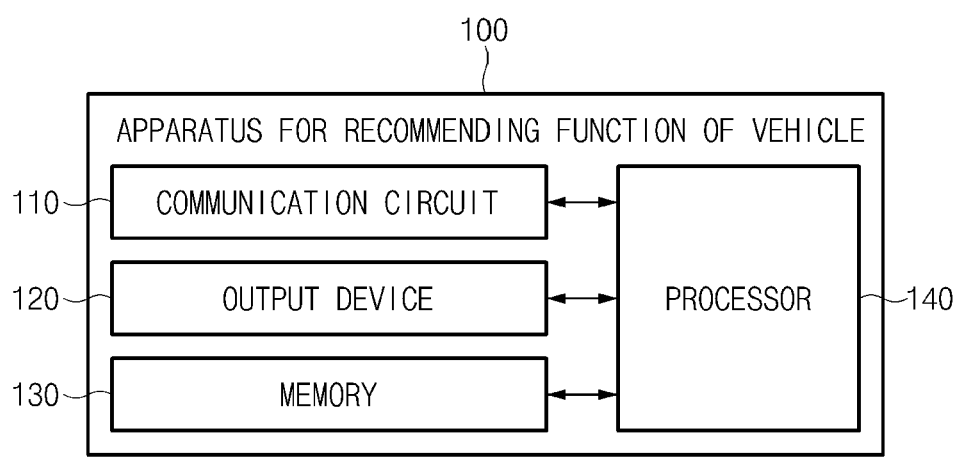
FIG. 1 is a block diagram illustrating a configuration of an apparatus for recommending a function of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings. In adding reference denotations to elements of each drawing, although the same elements are displayed on a different drawing, it should be noted that the same elements have the same denotations. In addition, in describing some forms of the present disclosure, if it is determined that a detailed description of related well-known configurations or functions blurs the gist of a form of the present disclosure, it will be omitted.

In describing some forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for recommending a function of a vehicle in some forms of the present disclosure.

Referring to FIG. 1, an apparatus 100 for recommending a function of a vehicle (hereinafter referred to as "apparatus 100") in some forms of the present disclosure may include a communication circuit 110, an output device 120, a memory 130, and a processor 140. The apparatus 100 may be loaded into the vehicle.

The communication circuit 110 may be configured to communicate with an external device. The communication circuit 110 may communicate with an external user terminal, for example, a personal computer (PC), a smartphone, a tablet, or a wearable device, and may communicate with an external server, such as a message storage server or an electronic mail (e-mail) server, which stores a message associated with a user.

The output device 120 may be configured to provide information to a user of the vehicle. The output device 120 may output a variety of information such as visual information and/or audible information. The output device 120 may include at least one of, for example, a speaker or a display.

The memory 130 may include a volatile memory and/or a nonvolatile memory. The memory 130 may store a message associated with the user, event information extracted from the message, and the like. The memory 130 may store information about a previously recommended task and information about whether recommendation is approved.

The processor 140 may be electrically connected with the communication circuit 110, the output device 120, and the memory 130. The processor 140 may control the communication circuit 110, the output device 120, and the memory 130 and may perform a variety of data processing and various arithmetic operations.

In some forms of the present disclosure, the processor 140 may collect a message associated with the user from an external device using the communication circuit 110. The processor 140 may collect a message associated with the user on a periodic basis or may collect the message associated with the user on an automatic basis when a trigger condition (e.g., starting of the vehicle) is met, from an external device which interworks with the electronic device 100. The message associated with the user may include at least a portion of, for example, an e-mail in which the user is included as a recipient or a sender, a short message service (SMS) message, an instant message, or a messenger message. For another example, the message associated with the user may include a text message obtained from an utterance of the user or an utterance of a party who takes with the user. The utterance may be included in a voice message or a call of the user.

In some forms of the present disclosure, the processor 140 may extract an updated message from the message associated with the user, stored in the external device and may store the updated message in a message database (DB) stored in the memory 130. The processor 140 may collect a message which is not stored in the memory 130 among messages stored in the external device. The processor 140 may update the message DB by storing the collected message in the memory 130.

In some forms of the present disclosure, the processor 140 may classify messages associated with the user into a plurality of groups depending on an intent of the user, included in each of the messages associated with the user.

The processor 140 may map the message DB to a Euclidean space. The processor 140 may cluster sentences, each of which includes similar intent, through machine learning. The processor 140 may generate a classifier for classifying a domain in a vector space. The processor 140 may classify, for example, messages into various groups such as a reservation related group, a local information group, a personal schedule group, a coupon service group, and a business related group.

In some forms of the present disclosure, the processor 140 may extract event information associated with movement of the user from a message associated with the user. The processor 140 may extract event information including contents associated with movement to a specific place to obtain an event suitable for the user who rides in the vehicle. The processor 140 may generate, for example, event information including at least a portion of purpose information, date information, time information, location information, or title information by analyzing the message associated with the user.

In some forms of the present disclosure, the processor 140 may store event information in an event management DB stored in the memory 130 in order of time corresponding to the event information. The processor 140 may verify time information included in the event information and may store the event information in order of time verified.

In some forms of the present disclosure, when event information is associated with reservation cancellation, the processor 140 may delete an event corresponding to the reservation cancellation from the event management DB. When a message corresponding to event information is a reservation cancellation message, the processor 140 may search the event management DB for an event, reservation of which is cancelled, and may delete the found event from the event management DB.

In some forms of the present disclosure, the processor 140 may determine priorities of recommendations based on the number of recommendations and the number of approvals to the recommendations, which are associated with a category including event information. The processor 140 may record the number of times that recommendations associated with events included in a specific category are performed. The processor 140 may record the number of times that the recommendations associated with the events included in the specific category are approved. The processor 140 may set a priority of an event included in a category where the ratio of the number of recommendations to the number of approvals to the recommendations is high to a high priority.

In some forms of the present disclosure, when a specified condition corresponding to event information is met, the processor 140 may output a notification of recommending execution of a task associated with the event information using the output device 120. The notification may include at least one of a voice notification or a notification message. For example, when a current time is included in a time interval corresponding to date information and time information included in event information, the processor 140 may output a notification. For another example, when a current location is included in an area corresponding to location information included in event information, the processor 140 may output a notification. The processor 140 may output a notification of inquiring about whether to execute a route guidance to a location corresponding to event information.

Figure 2:
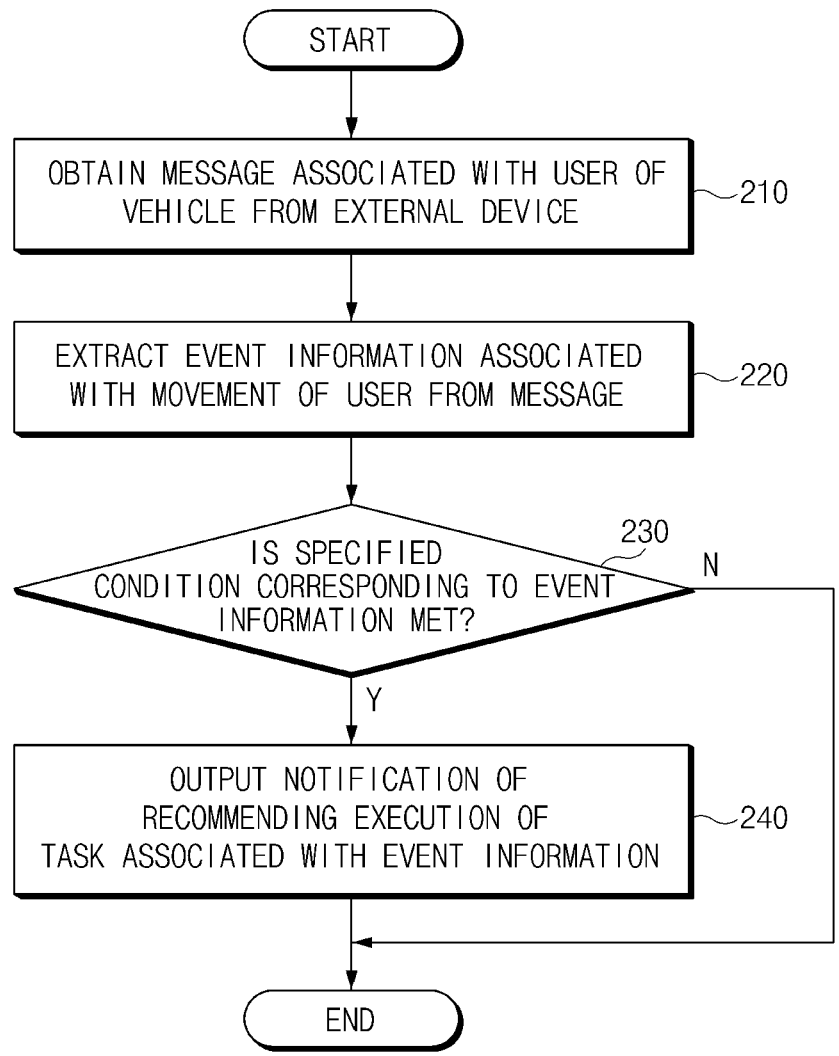
FIG. 2 is a flowchart illustrating a method for recommending a function of a vehicle.

FIG. 2 is a flowchart illustrating a method for recommending a function of a vehicle in some forms of the present disclosure.

Hereinafter, it may be assumed that an apparatus 100 of FIG. 1 performs a process of FIG. 2. Further, in a description of FIG. 2, an operation described as being performed by an apparatus may be understood as being controlled by a processor 140 of the apparatus 100.

Referring to FIG. 2, in operation 210, the apparatus may obtain a message associated with a user of a vehicle from an external vehicle. For example, the apparatus may obtain an e-mail received or transmitted by the user.

In operation 220, the apparatus may extract event information associated with movement of the user. For example, the user may extract event information associated with reserving a performance.

In operation 230, the apparatus may determine whether a specified condition corresponding to the event information is met. For example, the apparatus may determine that the specified condition is met when a reserved performance date arrives or upon 2 hours before a reserved performance time.

In operation 240, the apparatus may output a notification of recommending execution of a task associated with the event information. For example, the apparatus may output a notification of inquiring about whether to execute a route guidance to a reserved performance venue.

Figure 3:
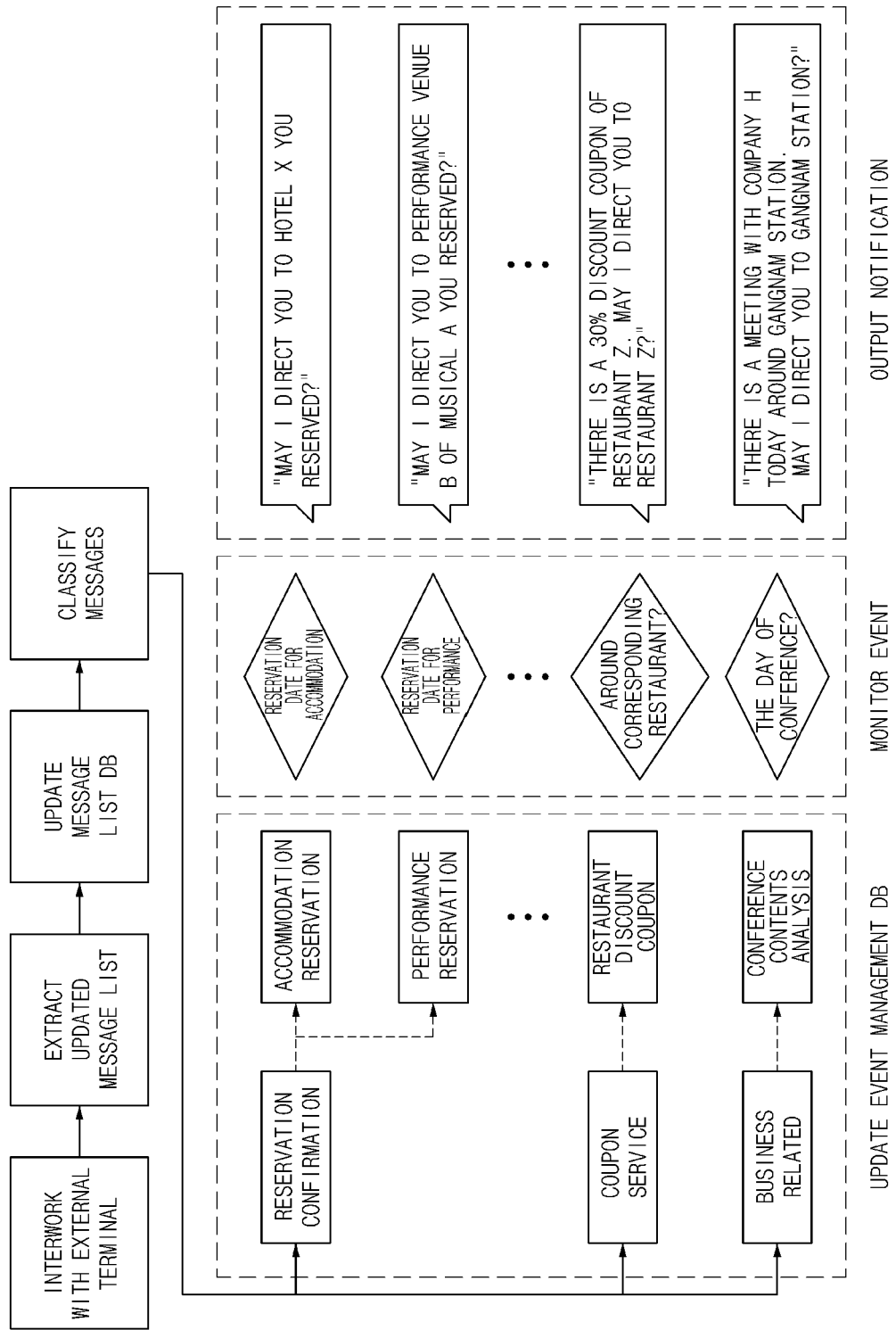
FIG. 3 is a flowchart illustrating a method for recommending a function of a vehicle.

FIG. 3 is a flowchart illustrating a method for recommending a function of a vehicle in some forms of the present disclosure.

Referring to FIG. 3, a vehicle in some forms of the present disclosure may interwork with an external terminal. The vehicle may extract an updated message list from a message list stored in the external terminal. The vehicle may obtain a message list and may update a message list DB stored in the vehicle using the obtained message list.

The vehicle may classify messages stored in the message list DB into a plurality of groups. For example, the vehicle may classify messages into a reservation confirmation group including a accommodation reservation message and a performance reservation message, a coupon service group including a restaurant discount coupon message, and a business related group including a conference contents analysis message. The vehicle may extract an event frame from the classified messages. The vehicle may store the event frame in an event management DB.

The vehicle may monitor an event stored in the event management DB. The vehicle may monitor, for example, whether a reservation date for the accommodation arrives, whether a reservation date for the performance arrives, whether the vehicle is located around a corresponding restaurant, and whether a conference date arrives.

The vehicle may output a notification corresponding to the monitored event. For example, the vehicle may output a notification of inquiring about whether to execute a route guidance to a place corresponding to the event.

Hereinafter, a description will be given of an exemplary operation of an apparatus for recommending a function of a vehicle with reference to FIGS. 4 to 10. For convenience of description, it is assumed that a message associated with a user is an e-mail received by the user and that a notification is a voice notification of inquiring about a route guidance to a location corresponding to event information.

FIGS. 4 to 10 are drawings illustrating exemplary operations of an apparatus for recommending a function of a vehicle according in some forms of the present disclosure.

Figure 4:
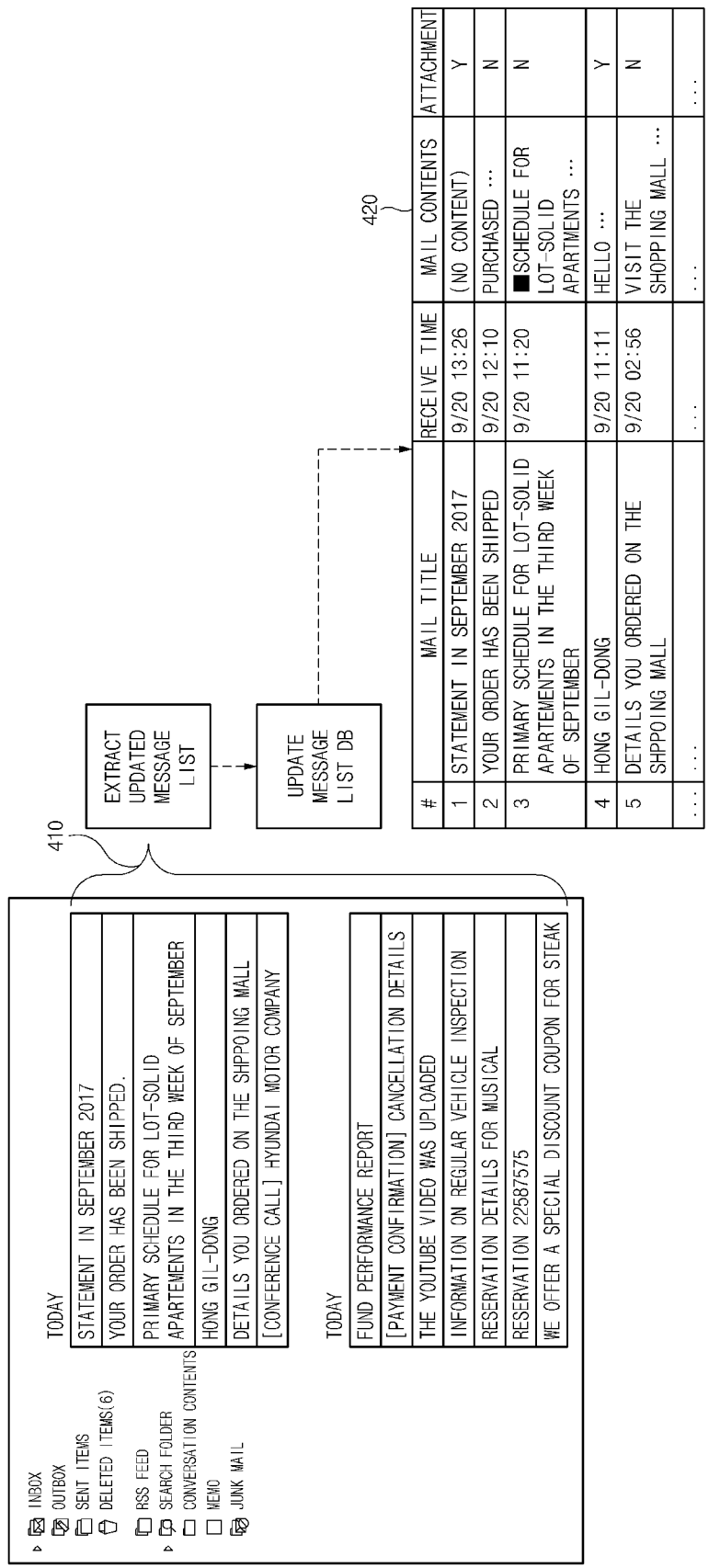
FIG. 4 is a drawing illustrating an exemplary operation of an apparatus for recommending a function of a vehicle.

Referring to FIG. 4, the vehicle in some forms of the present disclosure may collect a mail list 410 received by a user from an e-mail account associated with the vehicle. The vehicle may extract an updated mail list which is not stored in a mail list DB 420 from the mail list 410. The vehicle may update the mail list DB 420 when started or on a periodic basis.

Figure 5:
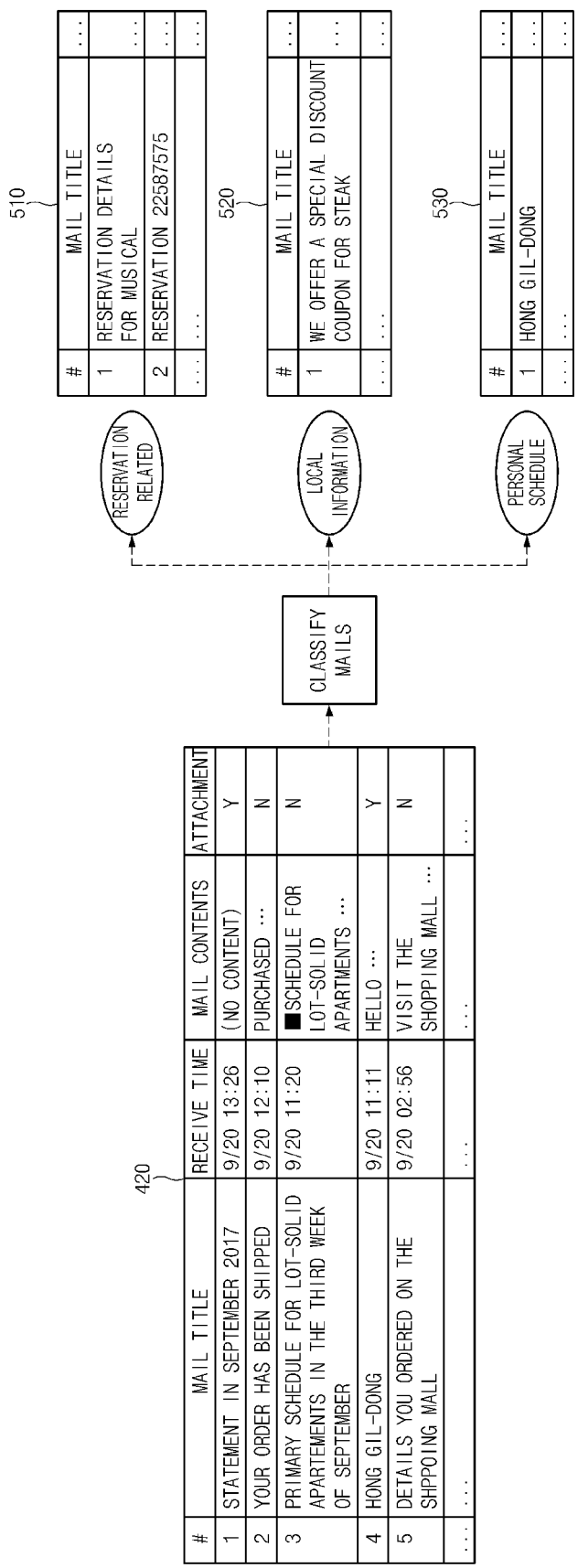
FIG. 5 is a drawing illustrating an exemplary operation of an apparatus for recommending a function of a vehicle.

Referring to FIG. 5, the vehicle in some forms of the present disclosure may classify mails stored in the mail list DB 420 into a plurality of groups. The vehicle may classify the mails into the plurality of groups depending on an intent of the user, included in the mails by analyzing contents included in the mails. The vehicle may classify a mail including information for requesting movement of the user, for example, only a mail including time information and place information, among mails stored in the mail list DB 420. For example, the vehicle may classify the mails stored in the mail list DB 420 into a reservation related group 510 including reservation information, a local information group 520 including information which is available in a specific area, and a personal schedule group 530 including personal schedule information.

Figure 6:
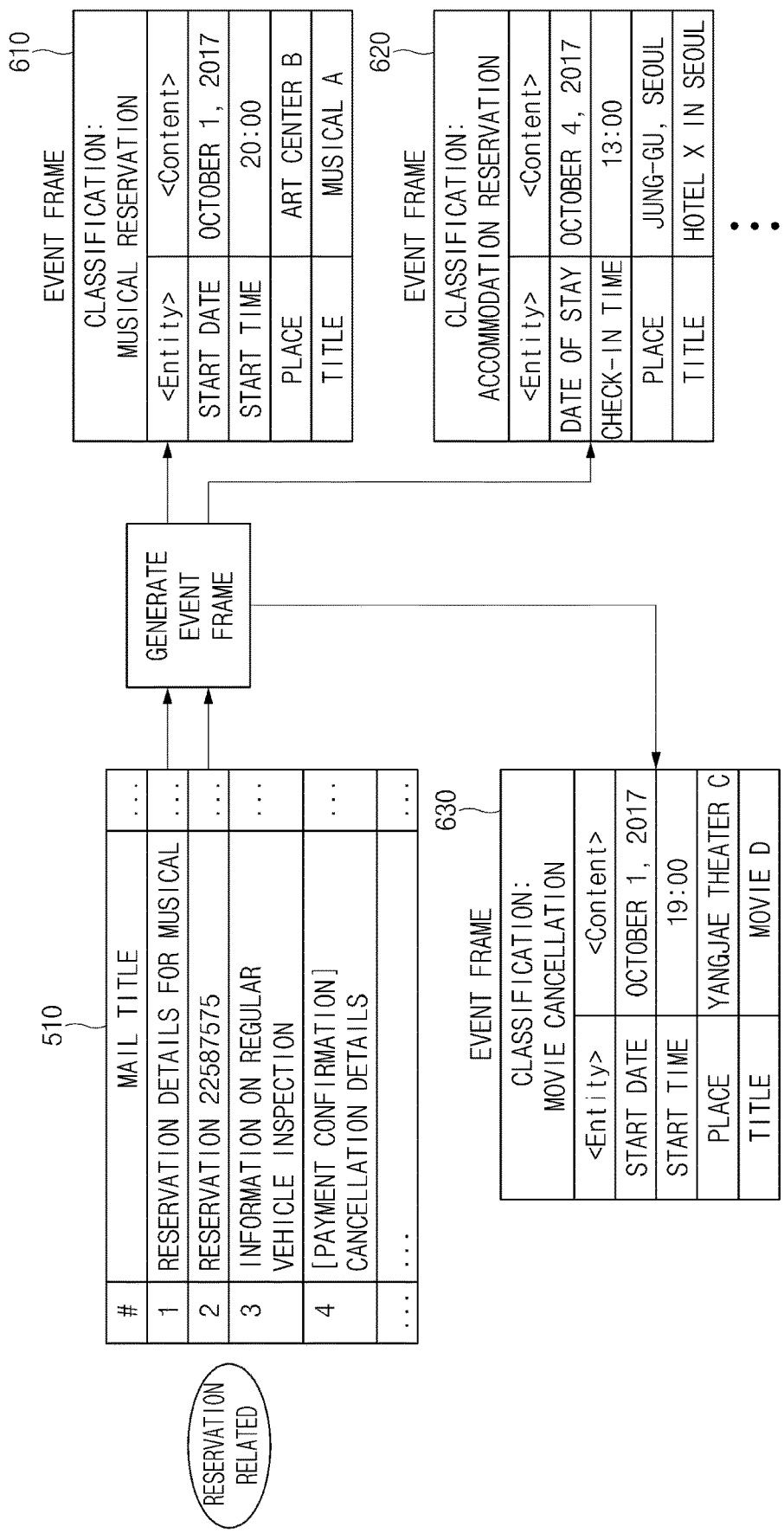
FIG. 6 is a drawing illustrating an exemplary operation of an apparatus for recommending a function of a vehicle.

Referring to FIG. 6, the vehicle in some forms of the present disclosure may generate an event frame by analyzing mails included in the reservation related group 510. For example, the vehicle may extract purpose information, date information, time information, location information, and title information associated with a reservation from a mail including reservation details for a musical. The vehicle may generate a first event frame 610 using the extracted information. In a similar manner, the vehicle may generate a second event frame 620 from a mail including reservation details for a accommodation. For another example, the vehicle may extract purpose information, date information, time information, location information, and title information of a reservation to be cancelled, from a mail including contents of cancelling a movie reservation. The vehicle may generate a third event frame 630 using the extracted information.

Figure 7:
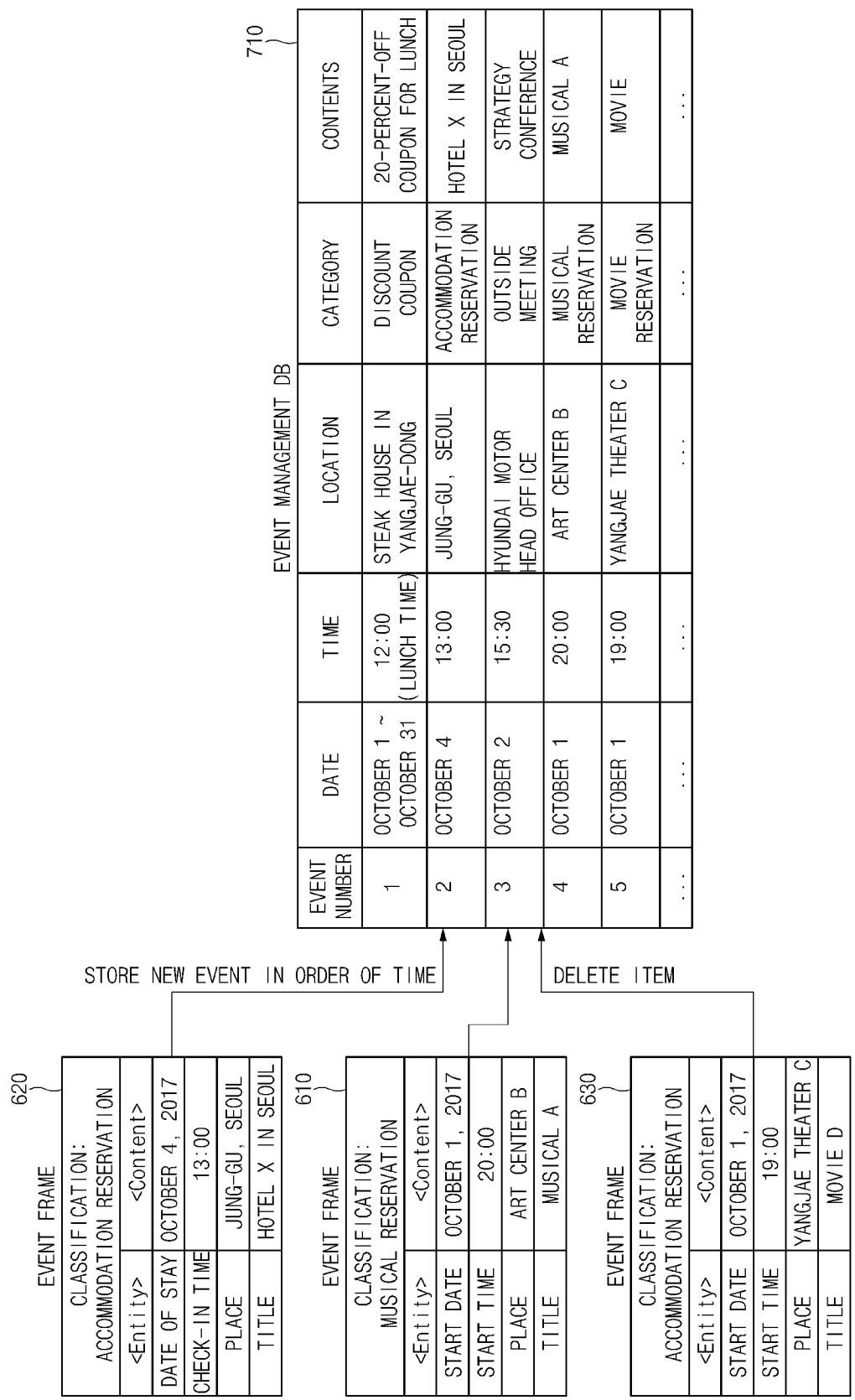
FIG. 7 is a drawing illustrating an exemplary operation of an apparatus for recommending a function of a vehicle.

Referring to FIG. 7, the vehicle in some forms of the present disclosure may reflect the first event frame 610, the second event frame 620, and the third event frame 630 in an event management DB 710. For example, the vehicle may store the first event frame 610 in the event management DB 710 to be located between an outside meeting event and a movie reservation event in consideration of time information of the first event frame 610. The vehicle may store the second event frame 610 in the event management DB 710 to be located between a discount coupon event and the outside meeting event in consideration of time information of the second event frame 620. Meanwhile, the vehicle may search the event management DB 710 for an event corresponding to the third event frame 630 for event cancellation. The vehicle may delete the found movie reservation event from the event management DB 710.

Figure 8:
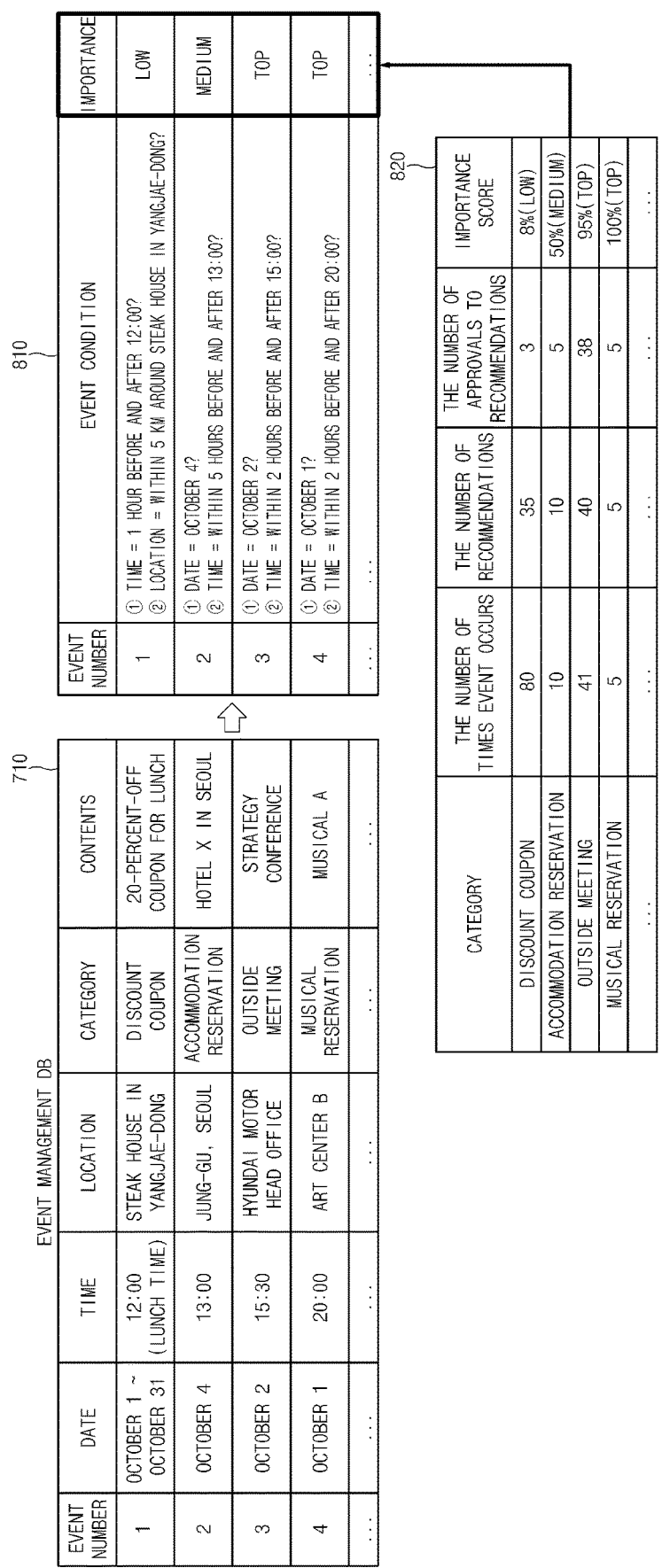
FIG. 8 is a drawing illustrating an exemplary operation of an apparatus for recommending a function of a vehicle.

Referring to FIG. 8, the vehicle in some forms of the present disclosure may monitor events stored in the event management DB 710. The vehicle may extract a condition where a notification occurs, from event information and may generate an event monitoring module 810 for monitoring an event based on the condition where the notification occurs. For example, the vehicle may monitor whether it is located within 5 kilometers around the steak house in Yangjae-dong at lunchtime (e.g., 1 hour before and after 12:00) in response to a restaurant discount coupon event using the event monitoring module 810. The vehicle may monitor whether a current time is within 5 hours before and after a reservation time "13:00" at a reservation date "October 4" in response to a accommodation reservation event using the event monitoring module 810. The vehicle may monitor whether a current time is within 2 hours before an appointment time "15:00" at an appointment date "October 2" in response to an outside meeting event using the event monitoring module 810. The vehicle may monitor whether a current time is within 2 hours before a reservation time "20:00" at a reservation date "October 1" in response to a musical reservation event using the event monitoring module 810. A condition (e.g., a time interval, a location range, and the like) for monitoring may be set under a previously stored rule corresponding to a category including an event.

The vehicle in some forms of the present disclosure may store a priority DB 820 which records the number of times an event occurs, the number of recommendations, the number of approvals to recommendations, and an importance score, corresponding to a category. The vehicle may calculate an importance score based on the ratio of the number of recommendations to the number of approvals to the recommendations. For example, the vehicle may set importance of an event included in a discount coupon category where recommendations of 35 times and approvals of 3 times are record to "low". The vehicle may set importance of an event included in a accommodation reservation category where recommendations of 10 times and approvals of 5 times are recorded to "medium". The vehicle may set importance of an event included in an outside meeting category where recommendations of 40 times and approvals of 38 times are recorded to "top". The vehicle may set importance of an event included in a musical reservation category where recommendations of 5 times and approvals of 5 times are recorded to "top". The vehicle may first recommend an event with high importance.

Figure 9:
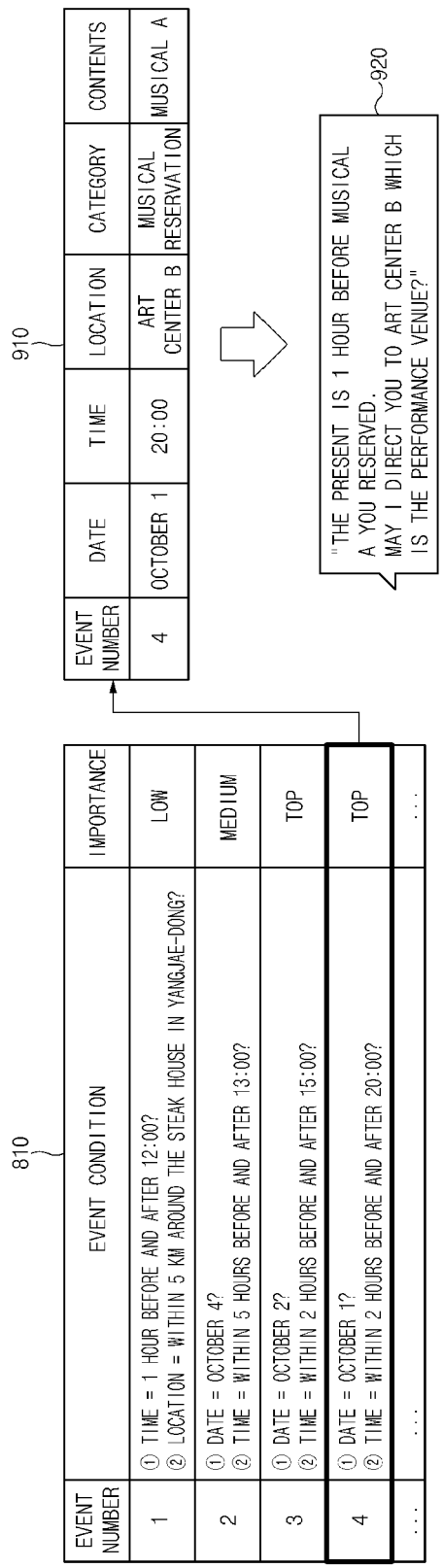
FIG. 9 is a drawing illustrating an exemplary operation of an apparatus for recommending a function of a vehicle.

Referring to FIG. 9, when the vehicle is in use by the user at 18 o'clock in October 1 using the event monitoring module 810, the vehicle in some forms of the present disclosure may determine that a notification condition for musical reservation event information 910 is met. When the notification condition of the musical reservation event information 910 is met, the vehicle may extract time information, location information, and title information from the musical reservation event information 910 and may generate a voice notification 920 of inquiring about whether to execute a route guidance to a reservation place "Art Center B" based on the extracted information. The vehicle may output the voice notification 920 using its speaker. When the user provides an input for approving the route guidance, the vehicle may start the route guidance to "Art Center B".

Figure 10:
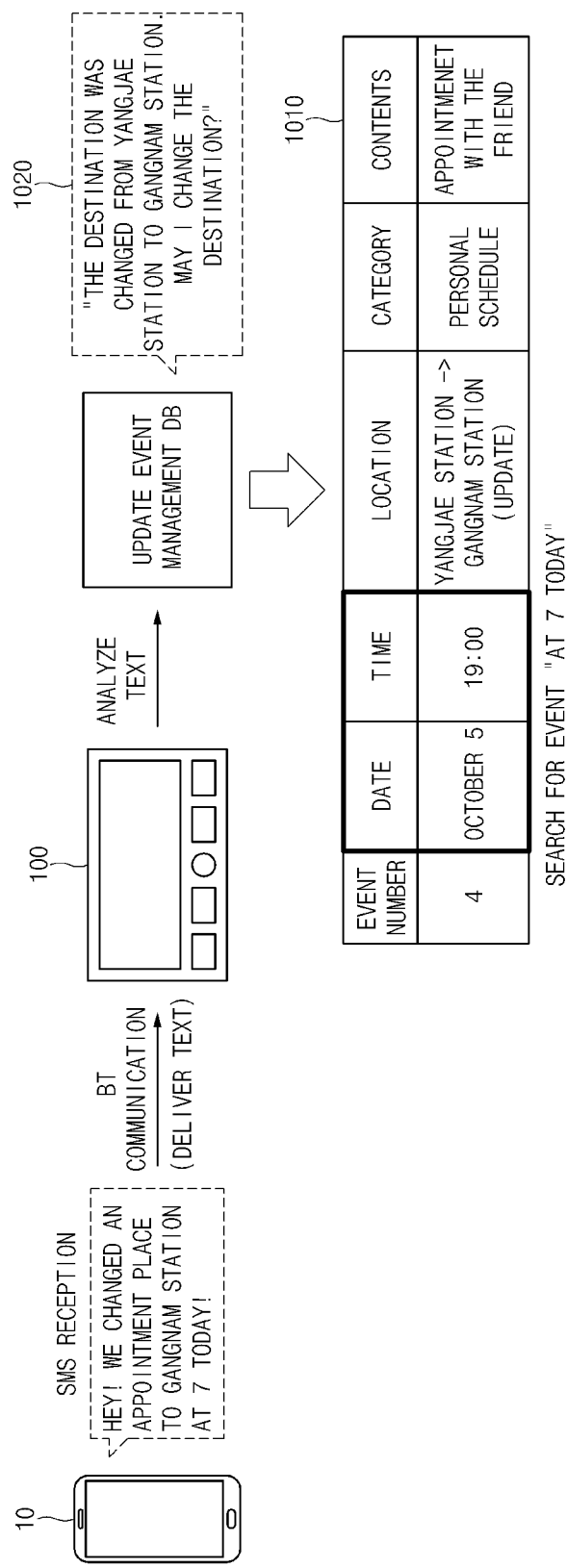
FIG. 10 is a drawing illustrating an exemplary operation of an apparatus for recommending a function of a vehicle.

Referring to FIG. 10, the vehicle in some forms of the present disclosure may approve a route guidance recommended by a voice notification. While the vehicle performs the route guidance, a user terminal 10 may receive a short message service (SMS) message of providing a notification that an appointment place is changed. An apparatus 100 loaded into the vehicle may collect an SMS message over Bluetooth communication. The vehicle may analyze the SMS message and may update changed location information to event information 1010. When the event information 1010 is updated, the vehicle may generate a voice notification 1020 of inquiring about whether to change a destination of a route guidance to the changed location. The vehicle may output the voice notification 1020 using the speaker. When the user provides an input for approving a change in destination, the vehicle may change the destination from Yangjae station to Kangnam station.

Figure 11:
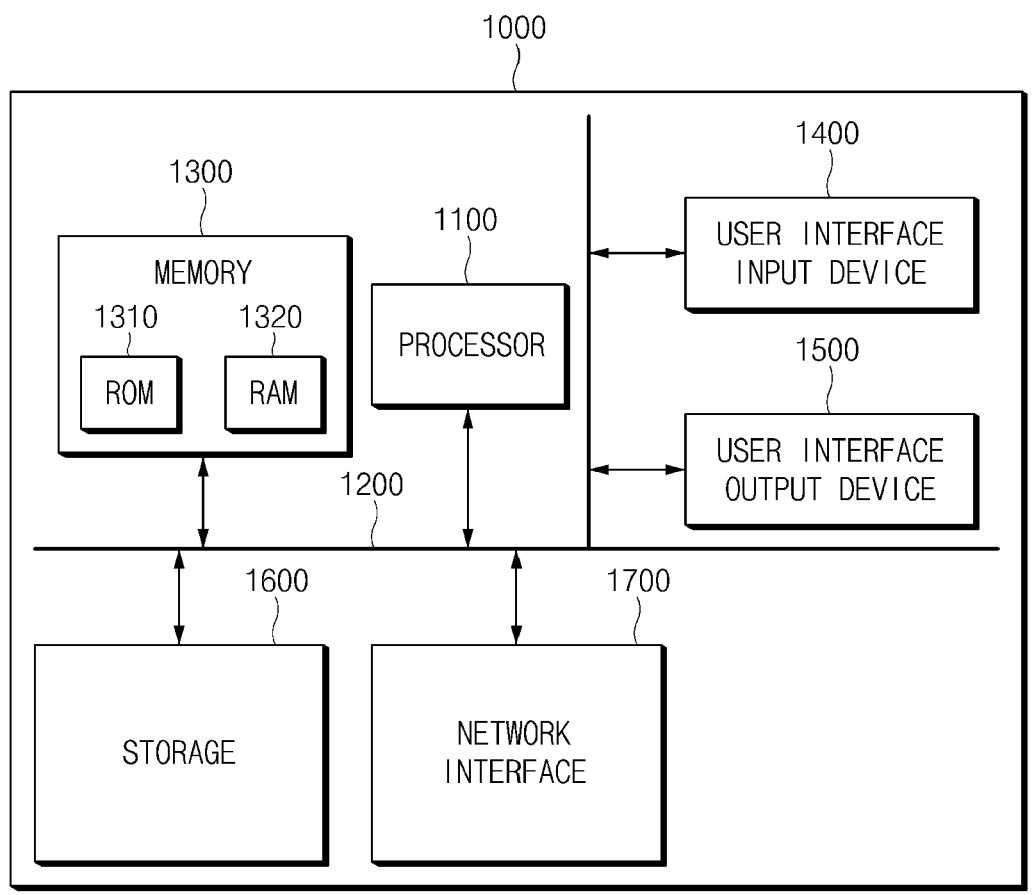
FIG. 11 is a block diagram illustrating a configuration of a computing system.

FIG. 11 is a block diagram illustrating a configuration of a computing system according to an form of the present disclosure.

Referring to FIG. 11, the above-mentioned method according to some forms of the present disclosure may be implemented through the computing system. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for executing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus for recommending a function of the vehicle according to an form of the prevent disclosure may increase convenience of the user of the vehicle by actively and proactively recommending a task associated with an event of the user based on a message collected from an external device.

In addition, various effects indirectly or directly ascertained through the present disclosure may be provided.

The description of the disclosure is merely exemplary in nature and, thus, variations that do not depart form the substance of the disclosure are intended to be within the scope of the disclosure. Such variations are not to be regarded as a departure from the spirit and scope of the disclosure.

What is claimed is:

1. An apparatus for recommending a function of a vehicle, the apparatus comprising:
    a communication circuit configured to communicate with an external device;
    an output device configured to provide information to a user of the vehicle;
    a memory; and
    a processor configured to be electrically connected with the communication circuit, the output device, and the memory, wherein the processor is configured to:
        obtain a message associated with the user from the external device using the communication circuit;
        extract event information associated with movement of the user from the message associated with the user;
        determine priorities of recommendations based on a number of recommendations and a number of approvals to the recommendations, wherein the number of recommendations and the number of approvals are associated with a category including the event information;
        when a specified condition corresponding to the event information is met, output notification, wherein the notification is configured to recommend execution of a task associated with the event information using the output device;
        generate the event information by analyzing the message associated with the user, wherein the event information includes at least a portion of purpose information, date information, time information, location information, or title information;
        collect a message associated with the user periodically or automatically from an external device interworking with the electronic device when a trigger condition is met, wherein the message associated with the user includes at least a portion of an electronic mail, a short message service message, an instant message, or a messenger message to identify the user as a recipient or a sender; and
    output the notification when a current time is included in a time interval corresponding to the date information and the time information.

2. A method for recommending a function of a vehicle, the method comprising:
    obtaining a message associated with a user of the vehicle from an external device;
    extracting event information associated with movement of the user from the message associated with the user;
    determining priorities of recommendations based on a number of recommendations and a number of approvals to the recommendations, wherein the number of recommendations and the number of approvals are associated with a category including the event information;
    when a specified condition corresponding to the event information is met, outputting notification, wherein the notification is configured to recommend execution of a task associated with the event information;
    generating the event information by analyzing the message associated with the user, wherein the event information includes at least a portion of purpose information, date information, time information, location information, or title information;
    collecting a message associated with the user periodically or automatically from an external device interworking with the electronic device when a trigger condition is met, wherein the message associated with the user includes at least a portion of an electronic mail, a short message service message, an instant message, or a messenger message to identify the user as a recipient or a sender; and
    outputting the notification when a current time is included in a time interval corresponding to the date information and the time information.

3. The apparatus of claim 1, wherein the message associated with the user comprises a text message obtained from an utterance of the user or an utterance of a party speaking with the user.

4. The apparatus of claim 1, wherein the processor is configured to:
    extract an updated message from the message associated with the user, wherein the message is stored in the external device; and
    store the updated message in a message database (DB) stored in the memory.

5. The apparatus of claim 1, wherein the processor is configured to:

classify the message associated with the user into a plurality of groups depending on an intent of the user that is included in the message associated with the user.

6. The apparatus of claim 1, wherein the processor is configured to:
output the notification that inquires about whether to execute a route guidance to a location corresponding to the event information.

7. The apparatus of claim 1, wherein the processor is configured to:
store the event information in an event management DB stored in the memory in order of time corresponding to the event information.

8. The apparatus of claim 7, wherein the processor is configured to:
when the event information is associated with reservation cancellation, delete an event corresponding to the reservation cancellation from the event management DB.

9. The apparatus of claim 1, wherein the output device comprises at least one of a speaker or a display.

10. The apparatus of claim 1, wherein the notification comprises at least one of a voice notification or a notification message.

11. The apparatus of claim 1, wherein the processor is configured to:
when a current location is included in an area corresponding to the location information, output the notification.

* * * * *